US012548979B2

United States Patent
Kang et al.

(10) Patent No.: US 12,548,979 B2
(45) Date of Patent: Feb. 10, 2026

(54) VCSEL ARRAY WITH NON-ISOLATED EMITTERS

(71) Applicant: Shenzhen Raysees AI Technology Co., Ltd., Shenzhen (CN)

(72) Inventors: Dongseok Kang, Mt Pleasant, MI (US); Yongxiang He, Sunnyvale, CA (US); Siva Kumar Lanka, Reno, NV (US); Yang Wang, Hefei (CN)

(*) Notice: Subject to any disclaimer, the term of this patent is extended or adjusted under 35 U.S.C. 154(b) by 541 days.

(21) Appl. No.: 17/766,315

(22) PCT Filed: Feb. 24, 2020

(86) PCT No.: PCT/CN2020/076454
§ 371 (c)(1),
(2) Date: Apr. 4, 2022

(87) PCT Pub. No.: WO2021/168616
PCT Pub. Date: Sep. 2, 2021

(65) Prior Publication Data
US 2024/0055832 A1 Feb. 15, 2024

(51) Int. Cl.
*H01S 5/183* (2006.01)
*H01S 5/042* (2006.01)
(Continued)

(52) U.S. Cl.
CPC ...... *H01S 5/18311* (2013.01); *H01S 5/04256* (2019.08); *H01S 5/18361* (2013.01); *H01S 5/423* (2013.01); *H01S 5/34* (2013.01)

(58) Field of Classification Search
CPC ............. H01S 5/18311; H01S 5/04256; H01S 5/18361; H01S 5/423; H01S 5/34; H01S 5/02461; H01S 5/04254
See application file for complete search history.

(56) References Cited

U.S. PATENT DOCUMENTS

| | | | |
|---|---|---|---|
| 2003/0007528 A1* | 1/2003 | Uchiyama | H01S 5/18313 372/46.013 |
| 2004/0120376 A1 | 6/2004 | Kwak | |
| | | (Continued) | |

FOREIGN PATENT DOCUMENTS

| | | |
|---|---|---|
| CN | 101394064 A | 3/2009 |
| CN | 101442183 A | 5/2009 |
| | (Continued) | |

OTHER PUBLICATIONS

Officer action English translation from Chinese patent office re foreign counterpart CN202080047509.5.

*Primary Examiner* — Yuanda Zhang
(74) *Attorney, Agent, or Firm* — Jigang Jin

(57) ABSTRACT

A VCSEL array comprises a plurality of non-isolated VCSEL emitters. Each non-isolated VCSEL emitter comprises a first reflector region, a current confining oxide layer, an oxide aperture, an active region, and a second reflector region. The current confining oxide layer and oxide aperture are made by oxidizing a relatively high Al-content layer via separate oxidation holes. The separate oxidation holes surround the oxide aperture. The first reflector regions of the plurality of non-isolated VCSEL structures are connected such that they are not isolated from each other completely by any isolation structure, and the second reflector regions of the plurality of non-isolated VCSEL structures are connected such that they are not isolated from each other completely by any isolation structure.

10 Claims, 12 Drawing Sheets

(51) Int. Cl.
*H01S 5/42* (2006.01)
*H01S 5/34* (2006.01)

(56) References Cited

U.S. PATENT DOCUMENTS

| | | | |
|---|---|---|---|
| 2019/0252858 A1* | 8/2019 | Riaziat | H01S 5/18366 |
| 2020/0203927 A1* | 6/2020 | Lee | H01S 5/2202 |
| 2020/0313391 A1* | 10/2020 | Li | H01S 5/04253 |
| 2021/0234342 A1* | 7/2021 | Donovan | G01S 17/10 |

FOREIGN PATENT DOCUMENTS

| | | |
|---|---|---|
| CN | 108141005 A | 6/2018 |
| CN | 109428261 A | 3/2019 |
| CN | 110649464 A | 1/2020 |
| EP | 0905835 A1 | 3/1999 |
| EP | 3496216 A1 | 6/2019 |

\* cited by examiner

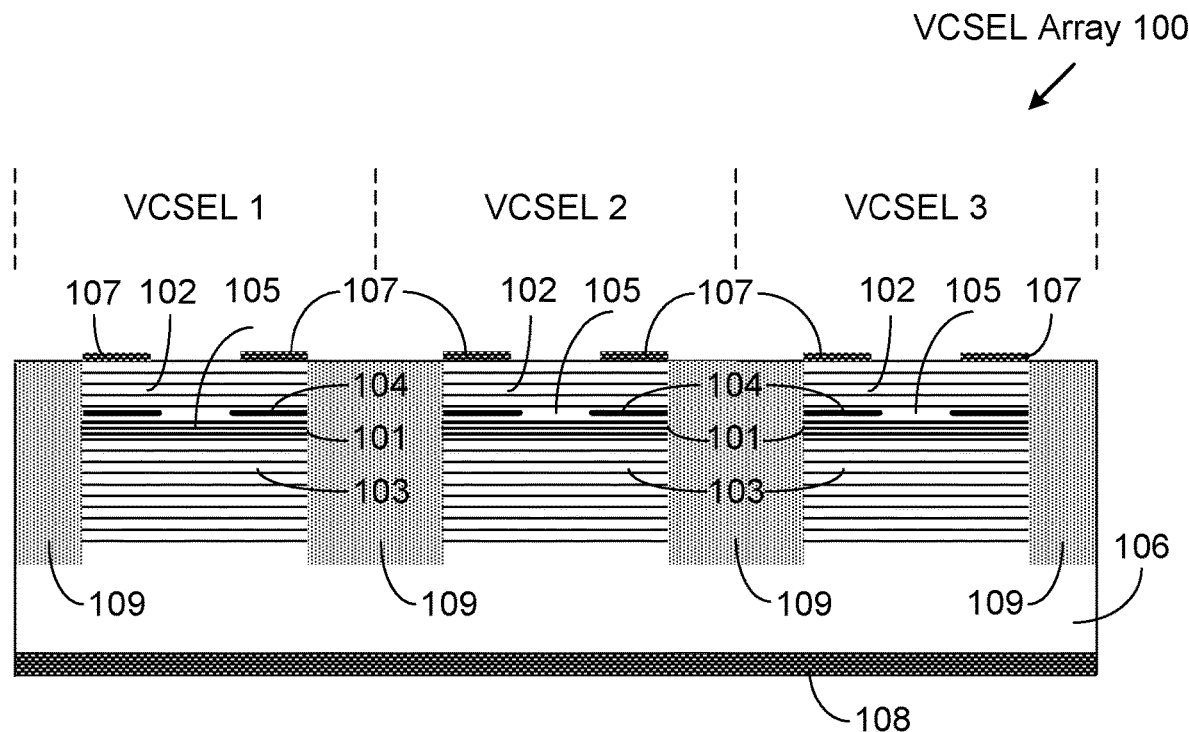
FIG. 1-A (Prior Art)
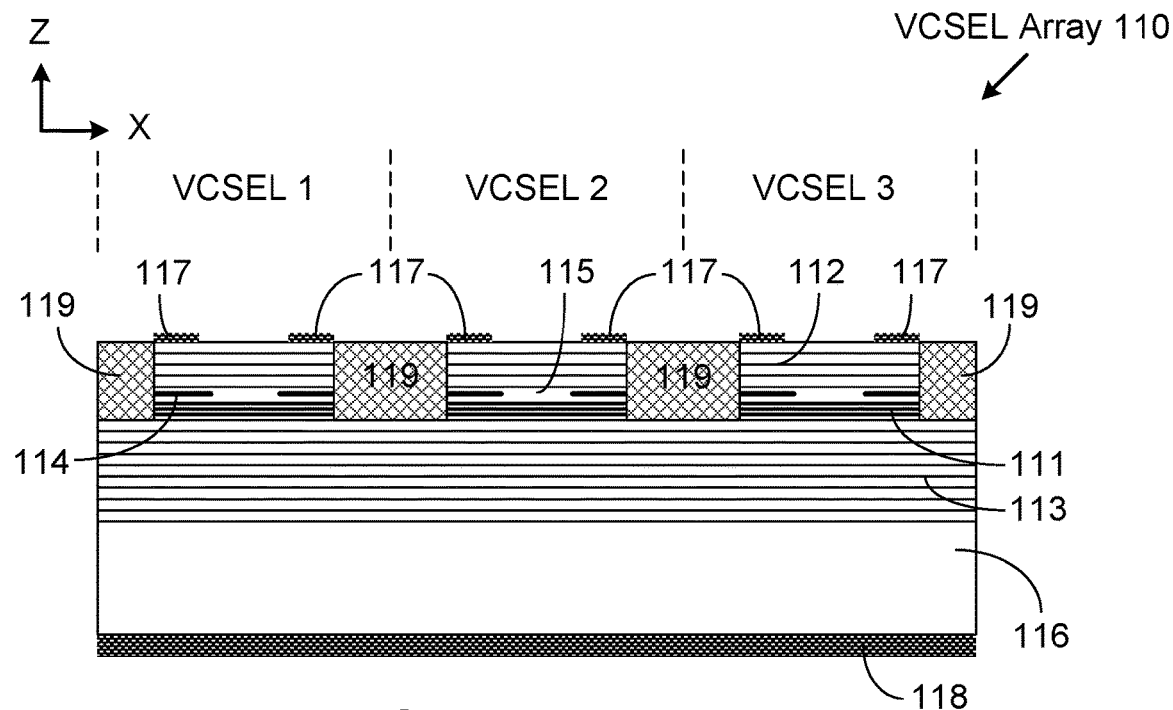
FIG. 1-B (Prior Art)

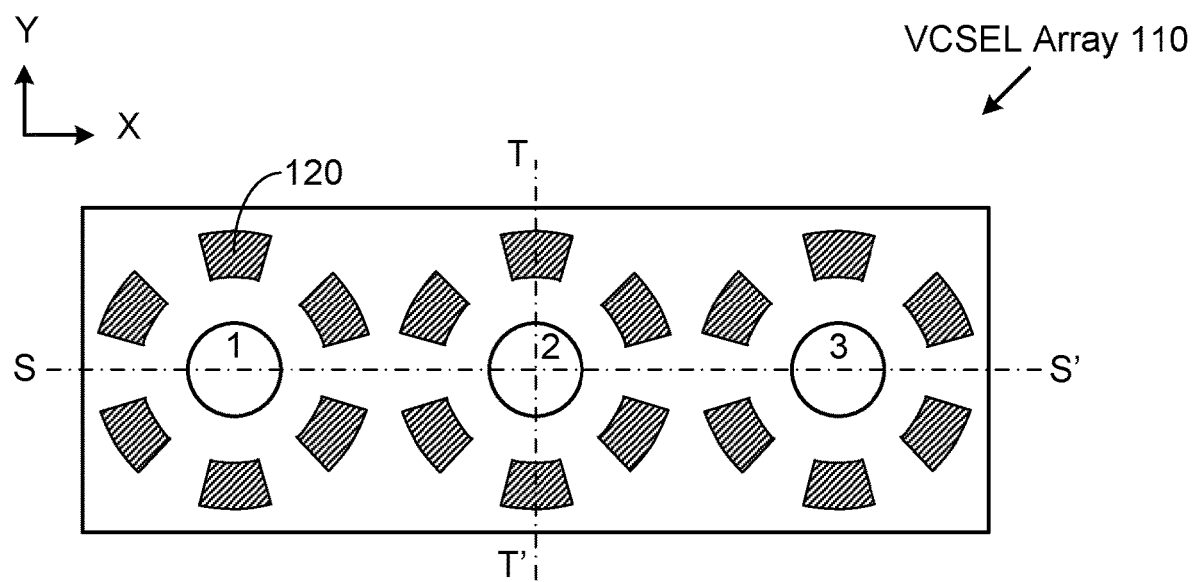
FIG. 1-C (Prior Art)
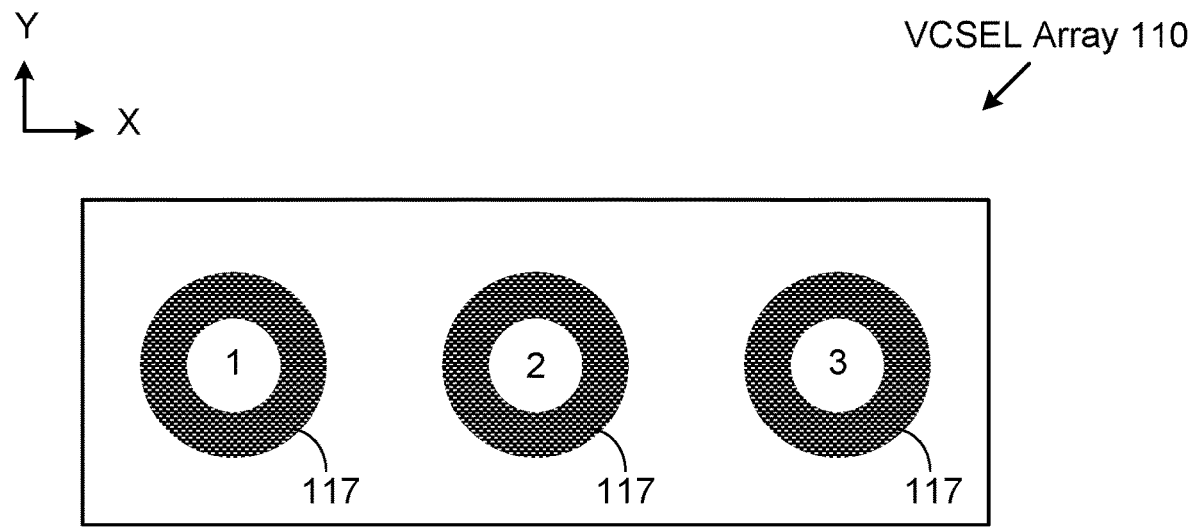
FIG. 1-D (Prior Art)

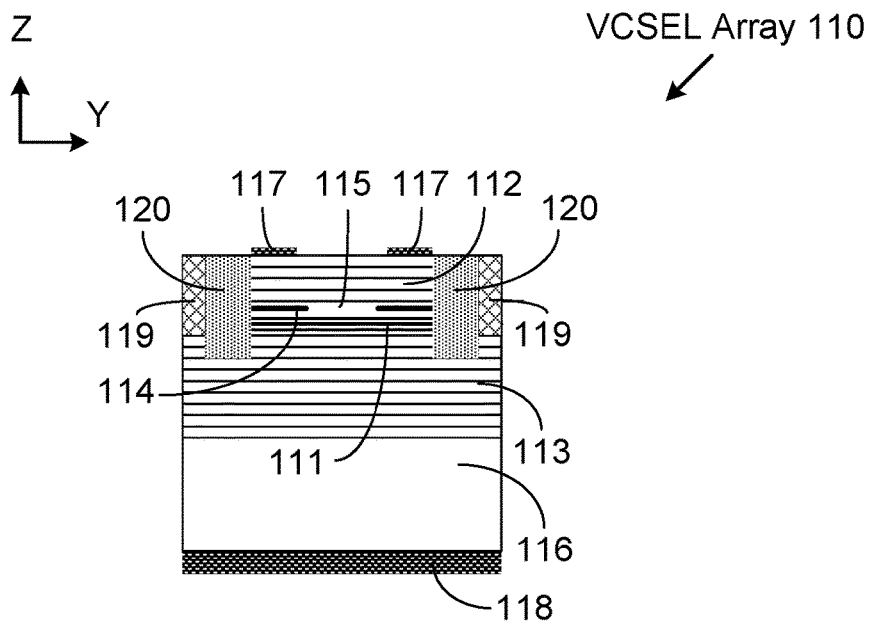
FIG. 1-E (Prior Art)
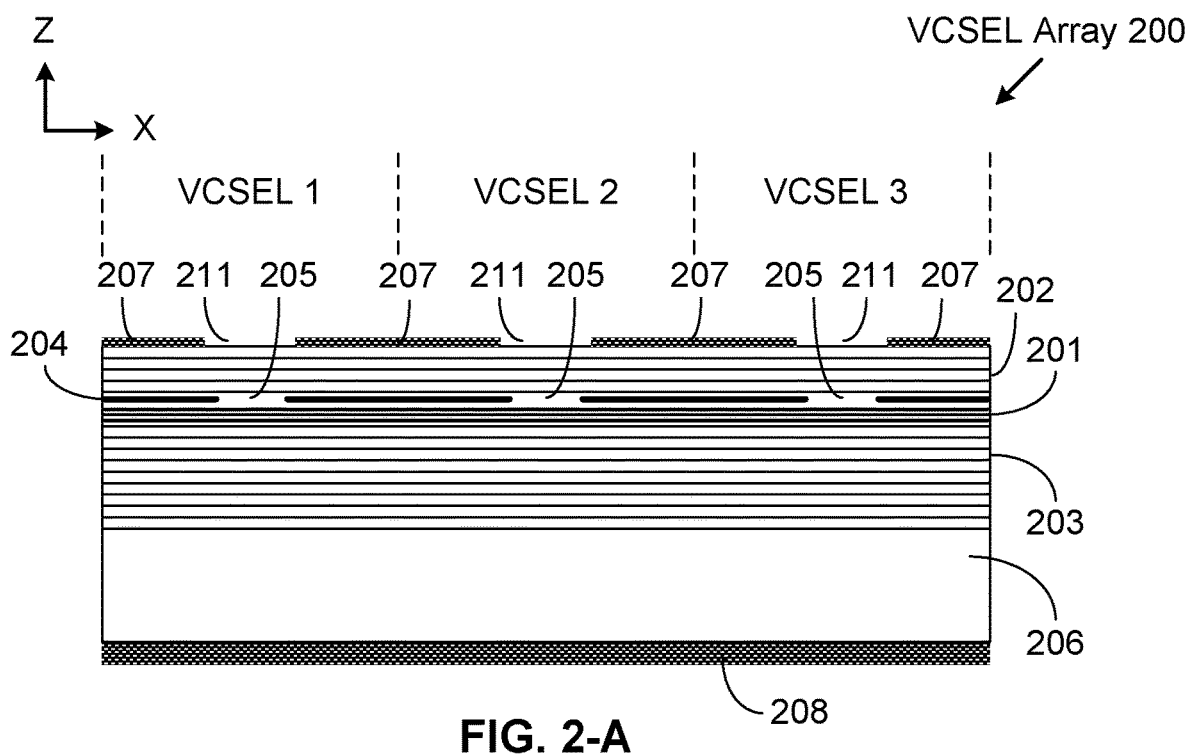
FIG. 2-A

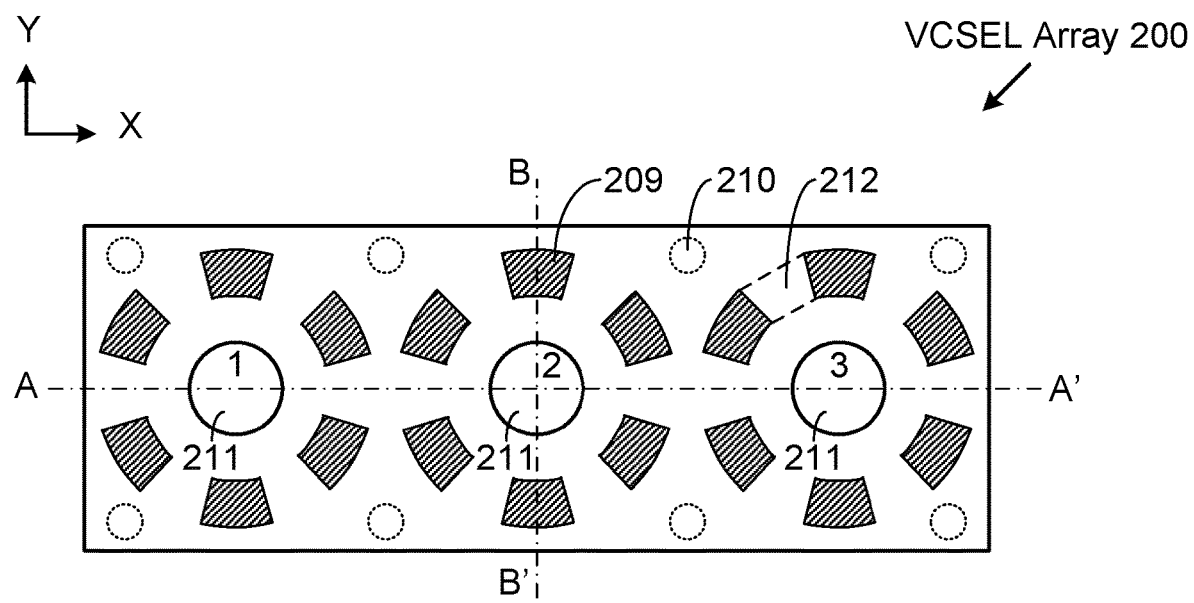
FIG. 2-B
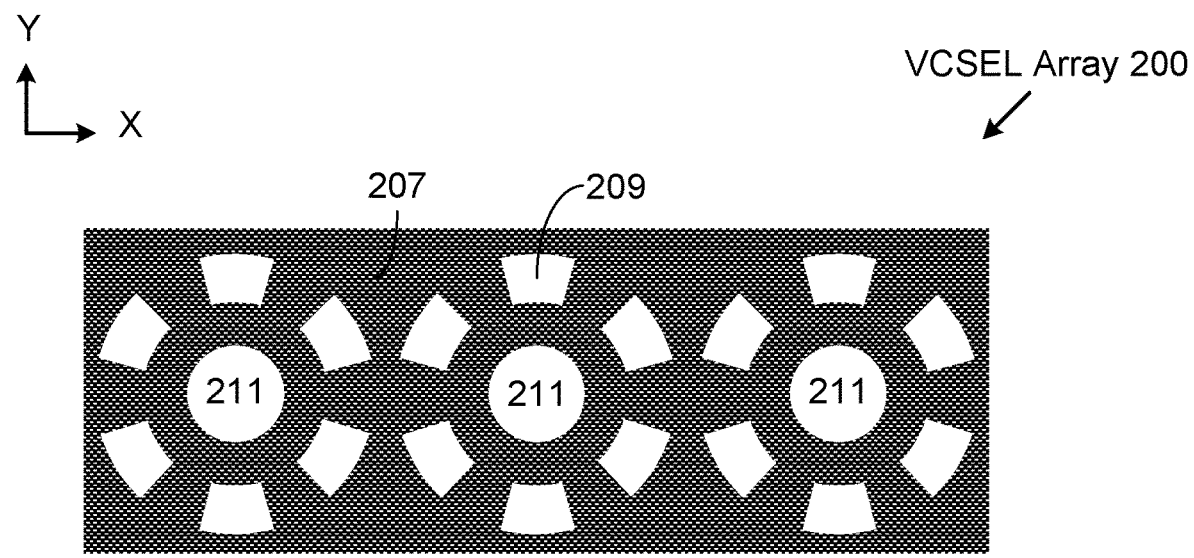
FIG. 2-C

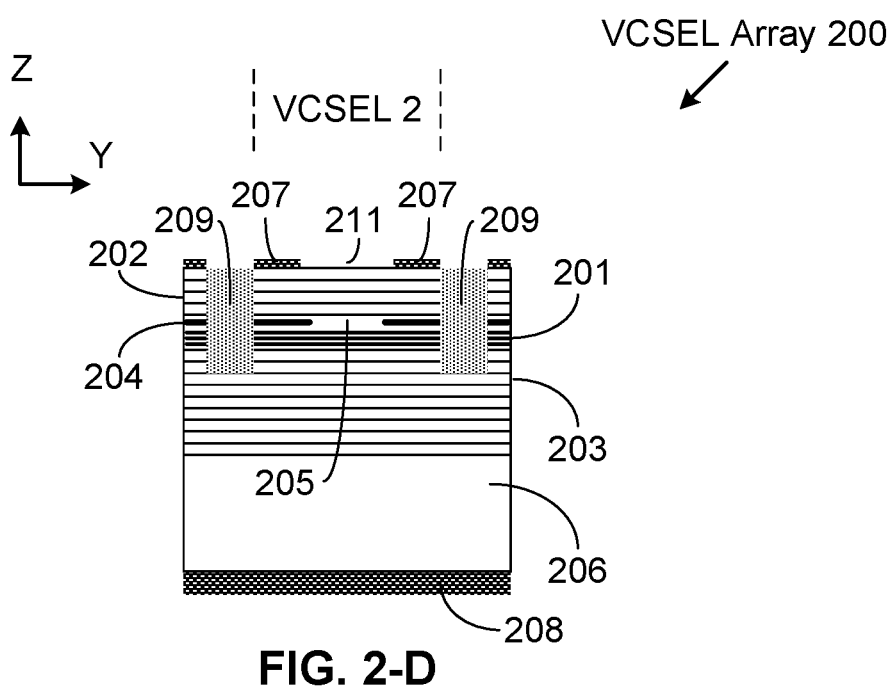
FIG. 2-D

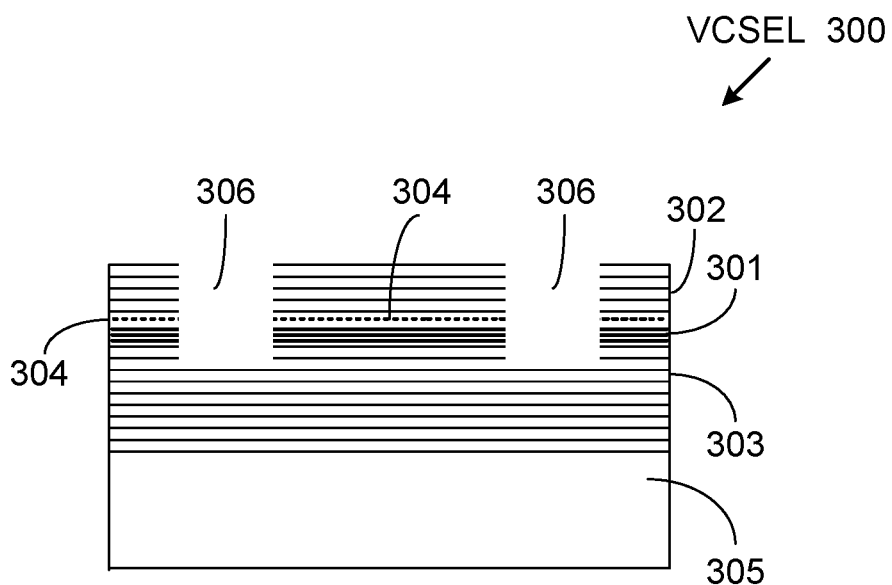
FIG. 3-A
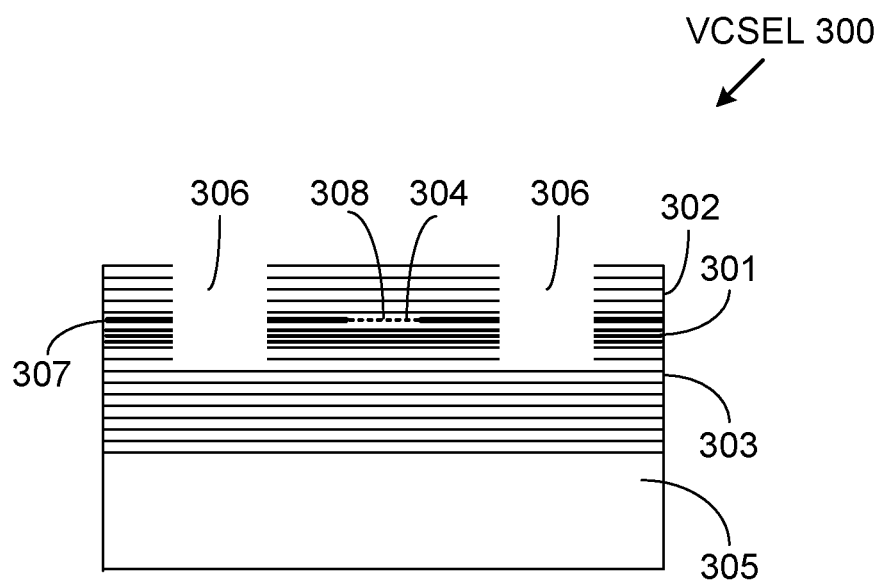
FIG. 3-B

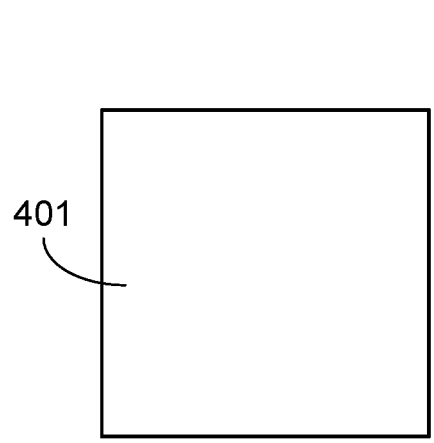
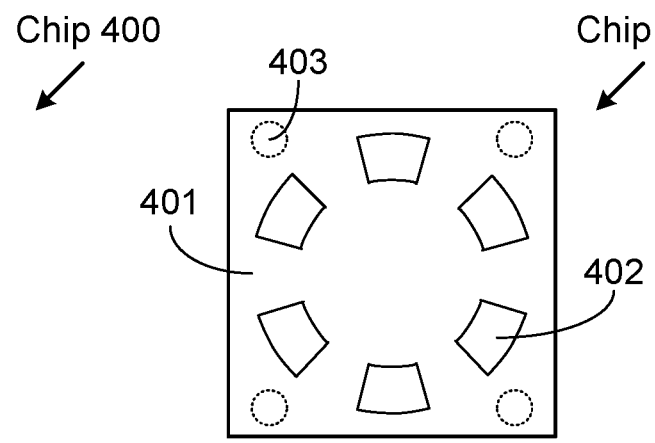
FIG. 4-A  FIG. 4-B
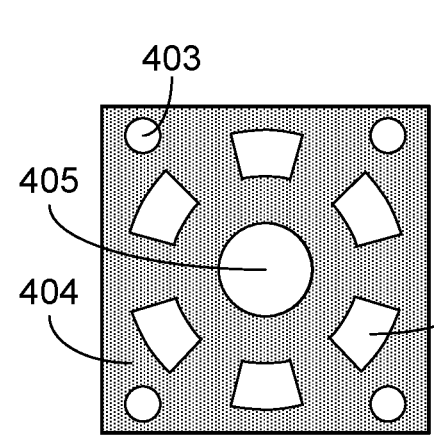
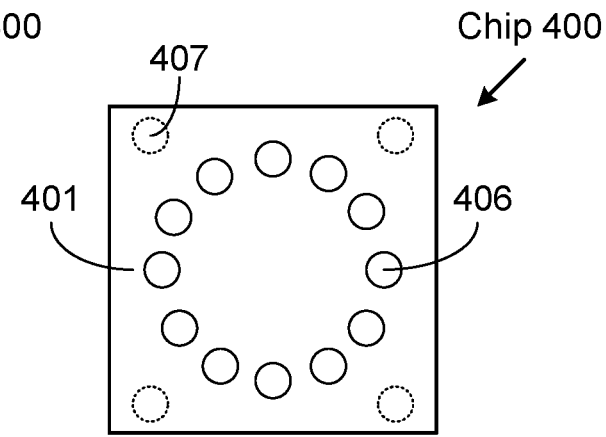
FIG. 4-C  FIG. 4-D

VCSEL ARRAY WITH NON-ISOLATED EMITTERS

CROSS-REFERENCE TO RELATED APPLICATIONS

This application is the U.S. National Stage of International Application No. PCT/CN2020/076454, filed Feb. 24, 2020, the content of which is incorporated herein by reference in its entirety.

TECHNICAL FIELD

This invention generally relates to Vertical Cavity Surface Emitting Laser (VCSEL) arrays and specifically to VCSEL arrays with non-isolated emitters.

BACKGROUND ART

Compared to edge-emitting semiconductor lasers with a horizontal Fabry-Perot resonator and cleaved facets acting as mirrors, VCSELs have a vertical cavity and emit a circular beam normal to the surface. VCSELs have many advantages over edge-emitting semiconductor lasers such as compact size, low power input, low sensitivity to temperature, low cost, high reliability, and ease of fabricating two-dimensional (2-D) VCSEL array, etc.

In recent years, VCSEL arrays become a prominent player in three-dimensional (3D) sensing applications. For instance, VCSEL arrays are used to build the light detection and ranging (LIDAR) systems for the emerging autonomous vehicle market.

Driving voltage is a key parameter in the operation of a VCSEL array. It is desirable to have a lower driving voltage. A lower driving voltage may improve laser output efficiency and open up new areas of applications. However, in conventional VCSEL arrays, the driving voltage is largely dominated by the emitter mesa diameter or the implant isolation area.

In addition, management of heat dissipation is very important for a VCSEL array. It improves the reliability as well as the efficiency of the device, especially at elevated temperatures. It is desirable to enhance heat dissipation of VCSEL arrays.

Conventional VCSEL arrays contain isolation regions made by ion implantation. However, ion implantation is a complicated and expensive fabrication process. It also affects optimization and design of a VCSEL array. Thus, it is desirable to eliminate the ion implantation process.

Therefore, there exists a need for an improved VCSEL array which has a lower driving voltage and improved heat dissipation. There also exists a need to eliminate the ion implantation in a fabrication process of VCSEL arrays.

SUMMARY OF INVENTION

Technical Problem

Solution to Problem

Technical Solution

The present invention discloses VCSEL arrays with non-isolated emitters. In one embodiment, a VCSEL array comprises a plurality of VCSEL structures formed on a substrate. Each VCSEL structure comprises a first reflector region, a current confining oxide layer below the first reflector region, an active region, and a second reflector region. The first reflector regions of the plurality of VCSEL structures are connected such that they are not completely isolated from each other by any isolation structure, and the second reflector regions of the plurality of VCSEL structures are connected such that they are not isolated from each other completely by any isolation structure.

In one embodiment, the top contacts for the plurality of VCSEL structures are physically connected.

BRIEF DESCRIPTION OF DRAWINGS

Description of Drawings

Figure 5:
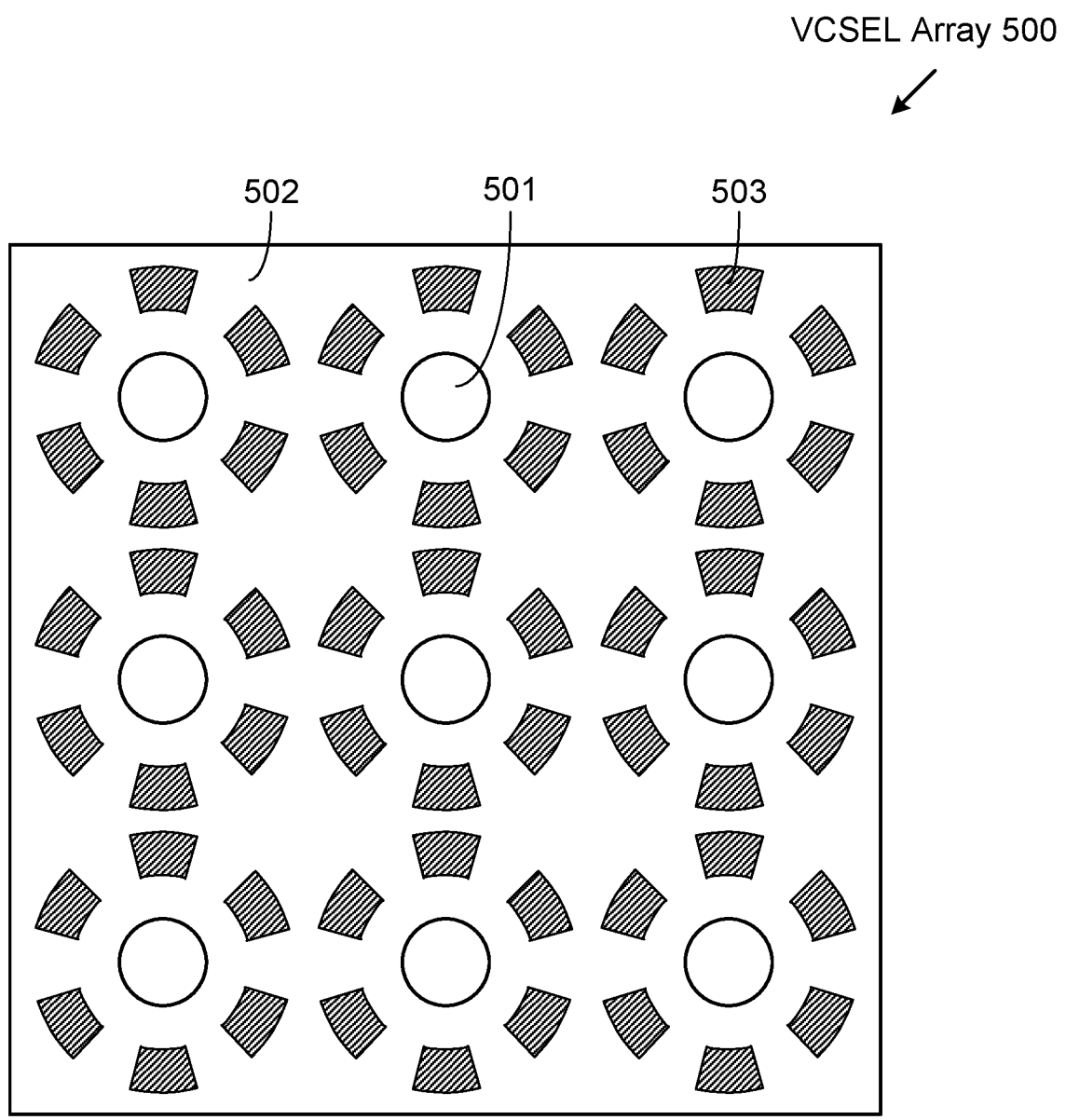

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

FIG. 1-A is a cross-sectional view of a prior art mesa-type VCSEL array.

FIG. 1-B is a cross-sectional view of a prior art trench-type VCSEL array.

FIG. 1-C schematically illustrates a top view of the prior art VCSEL array shown in FIG. 1-B.

FIG. 1-D illustrates the top contacts of the prior art VCSEL array shown in FIG. 1-B.

FIG. 1-E schematically illustrates another cross-sectional of the prior art VCSEL array shown in FIG. 1-B.

FIG. 2-A schematically illustrates a cross-sectional view of a VCSEL array containing non-isolated VCSEL emitters, according to one embodiment of the present invention.

FIG. 2-B schematically illustrates a top view of the VCSEL array shown in FIG. 2-A, according to one embodiment of the present invention.

FIG. 2-C illustrates the top contacts of the VCSEL array shown in FIG. 2-A, according to one embodiment of the present invention.

FIG. 2-D schematically illustrates another cross-sectional of the VCSEL array shown in FIG. 2-A, according to one embodiment of the present invention.

FIGS. 3-A and 3-B schematically illustrate cross-sectional views of a VCSEL device, according to one embodiment of the present invention.

FIGS. 4-A, 4-B, and 4-C schematically illustrate an oxidation process, according to one embodiment of the present invention.

FIG. 4-D schematically illustrates another oxidation process, according to one embodiment of the present invention.

FIG. 5 illustrates a schematic top view of a VCSEL array containing non-isolated emitters, according to one embodiment of the present invention.

Figure 6:
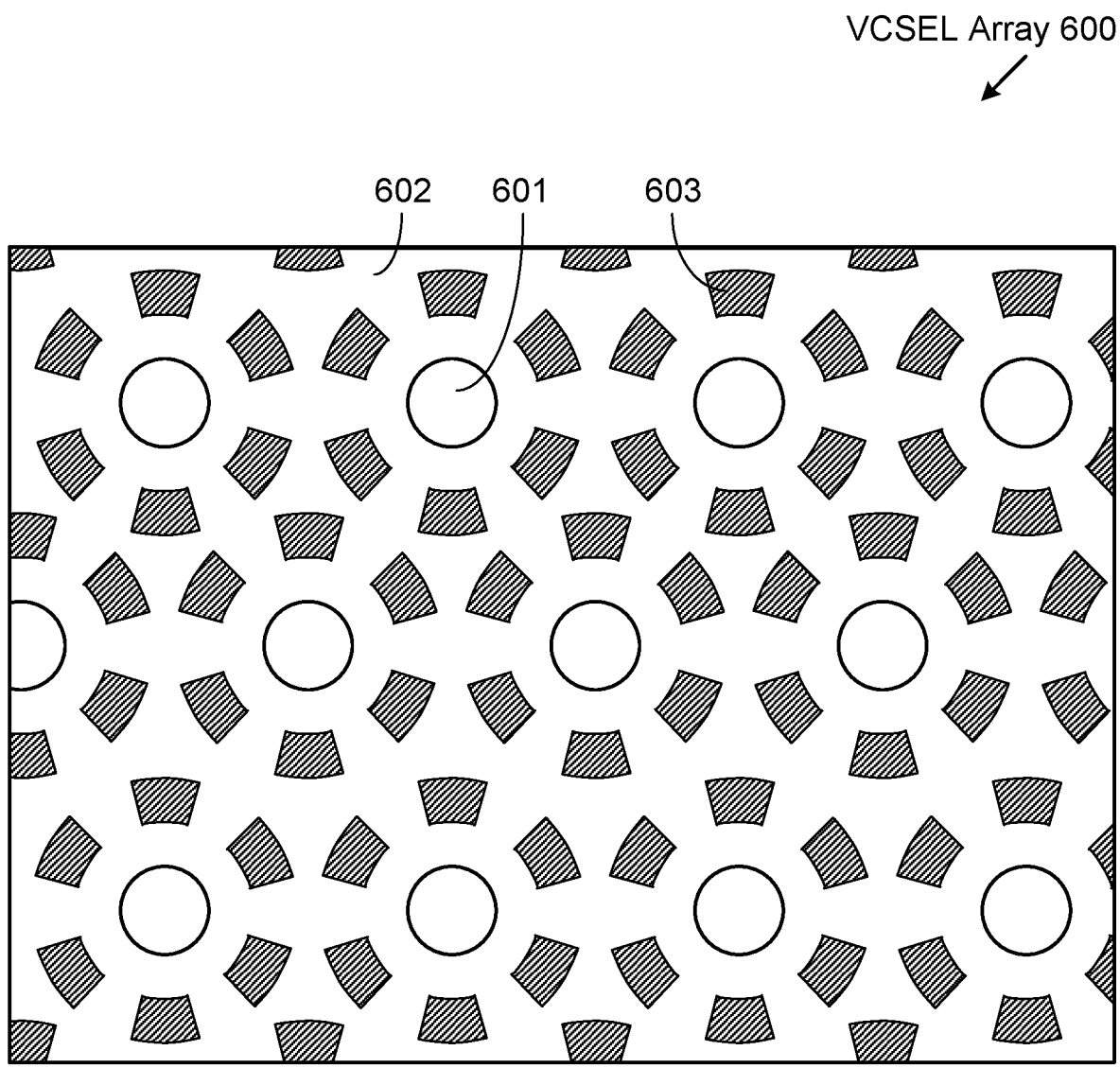

FIG. 6 illustrates a schematic top view of a VCSEL array containing non-isolated emitters, according to one embodiment of the present invention.

Figure 7:
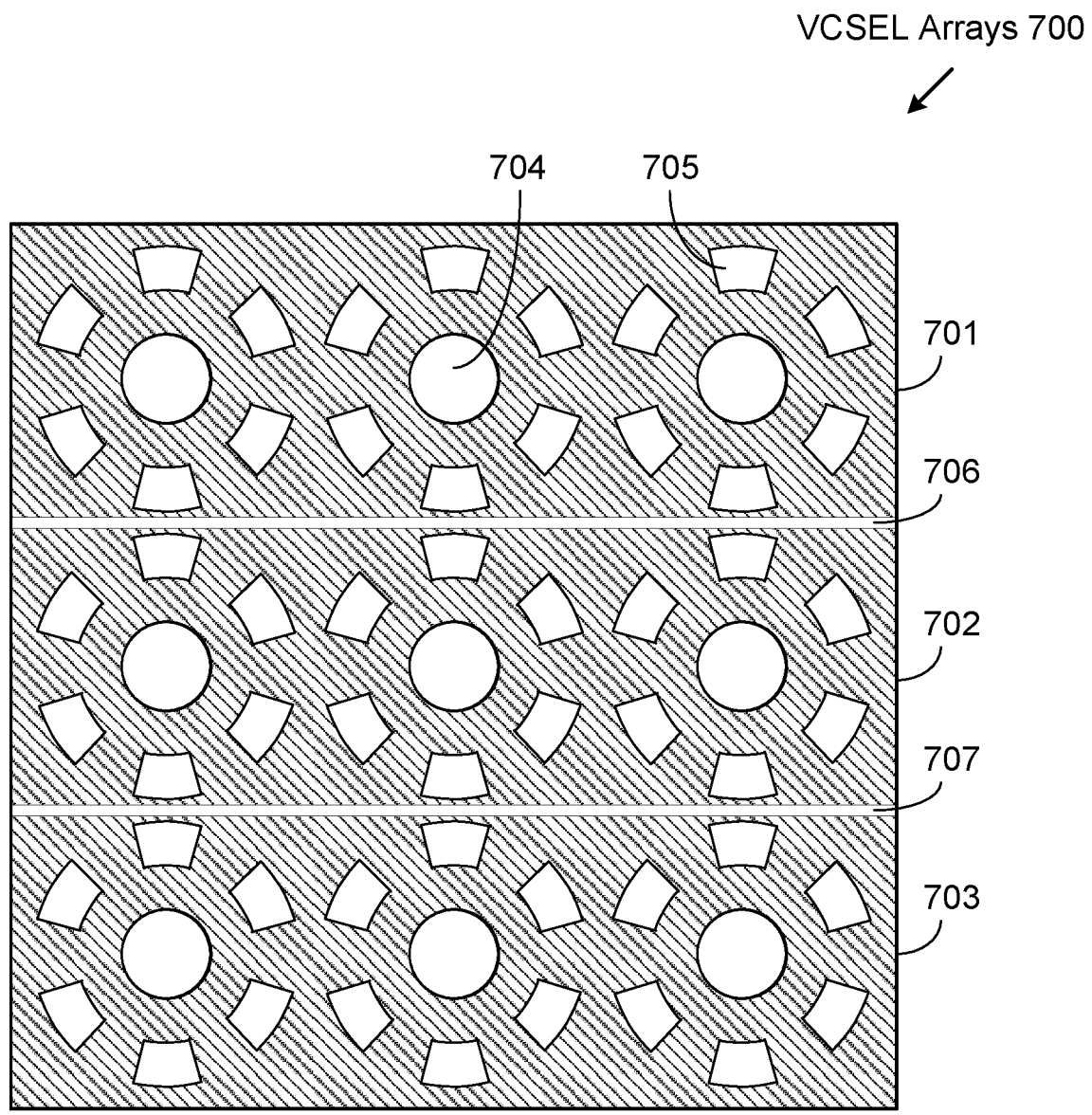

FIG. 7 illustrates a schematic top view of three VCSEL arrays containing non-isolated emitters, according to one embodiment of the present invention.

Figure 8:
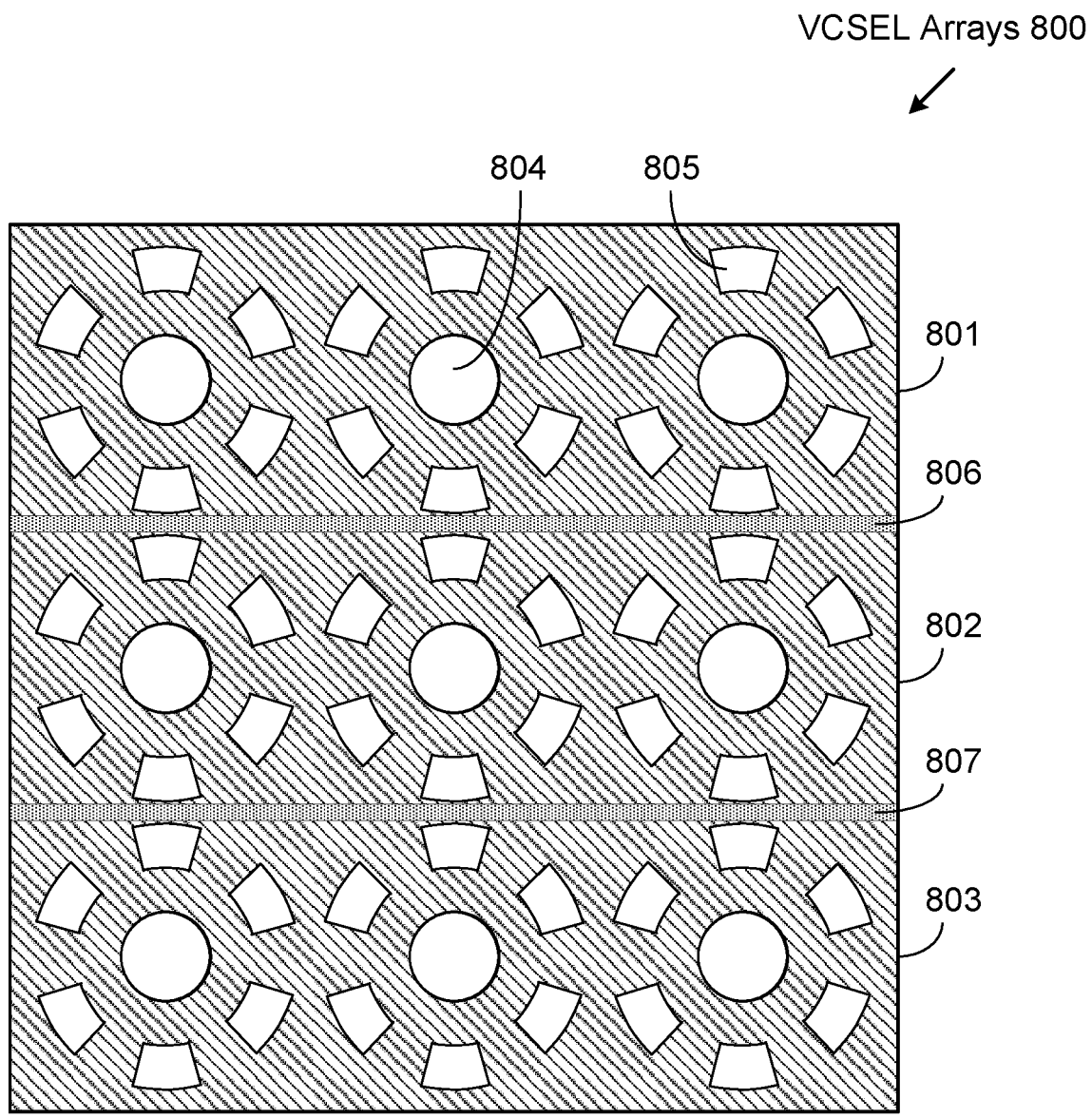

FIG. 8 illustrates a schematic top view of three VCSEL arrays containing non-isolated emitters, according to one embodiment of the present invention.

Figure 9:
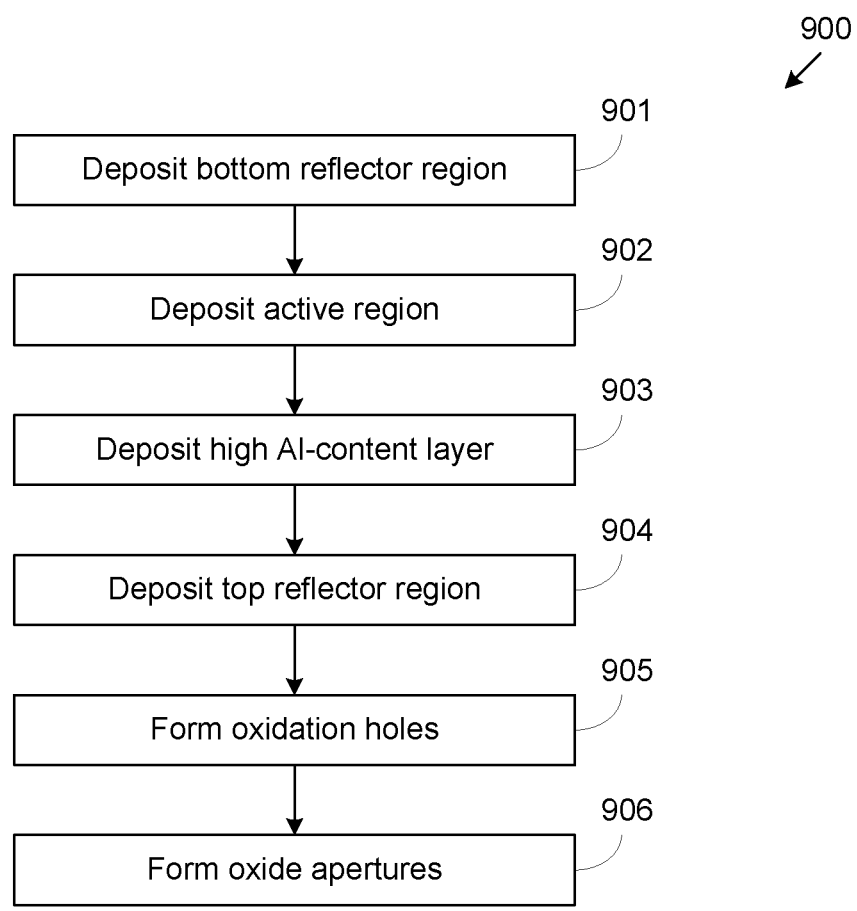

FIG. 9 is a flow chart illustrating a schematic fabrication process, according to one embodiment of the present invention.

MODE FOR THE INVENTION

Mode for Invention

Detailed description of the present invention is provided below along with figures and embodiments, which further clarifies the objectives, technical solutions, and advantages of the present invention. It is noted that schematic embodiments discussed herein are merely for illustrating the invention. The present invention is not limited to the embodiments disclosed.

FIG. 1-A shows a prior art mesa-type VCSEL array 100 in a cross-sectional view. Array 100 comprises VCSELs 1, 2, and 3 on a substrate 106. The VCSELs are separated by isolation structures 109. It is noted that array 100 may comprise thousands or tens of thousands of VCSELs. The three VCSELs are shown here for explanation purposes. Similarly, in other figures and descriptions below, only a few VCSELs or a few VCSEL arrays are used for explaining principles. VCSEL 1, 2, or 3 represents a top-emitting VCSEL structure or a top-emitting VCSEL emitter which emits a laser beam through the top surface when charged with an electrical current. As used herein, a VCSEL, VCSEL structure, and VCSEL emitter have the same meaning and may be used interchangeably.

As shown in the figure, typically, each VCSEL includes an active region 101, a top reflector region 102, a bottom reflector region 103, and a current confining oxide layer 104. Active region 101 contains a multiple-quantum-well (MQW) configuration. Reflector region 102 may contain a p-type Distributed Bragg Reflector (DBR). Reflector region 103 may contain an n-type DBR. The current confining oxide layer 104 is formed to achieve current confinement and it defines an oxide aperture 105 allowing laser beam to go through. Substrate 106 may be a conductive n-type substrate. The quantum wells and DBRs are grown on substrate 106 in an epitaxial process. Reflector regions 102 and 103 are electrically conductive. A dielectric layer (not shown) may be deposited on the top surfaces of reflector regions 102 and a plurality of vias (not shown) may be etched on the dielectric layer. Then, a top contact metal layer may be deposited on the etched areas and the dielectric layer to form a ring-shaped top contact 107 for each VCSEL. These ring-shaped top contacts 107 are structurally isolated from each other in the top contact metal layer. In the figure, top contacts 107 are presented in a simplified manner, mainly displaying the metal contact function. On the bottom surface of substrate 106, a metal layer is deposited to form a bottom contact 108 for all VCSELs of the array. Contacts 107 and 108 serve as the anode and cathode contacts, respectively. Since top contacts 107 are electrically connected via pad metals (not shown), the anode contacts of the VCSELs are shorted.

In a conventional mesa-type VCSEL array as shown in FIG. 1-A, VCSELs 1, 2, and 3 are separated by isolation structure 109. Isolation structures 109 is made by etching trenches and then depositing dielectric materials in the trenches. These isolation structures have an annular or ring shape such that each VCSEL emitter is encircled by an isolation ring completely. As shown in FIG. 1-A, isolation structures 109 may extend vertically through the top reflector region 102 and the active region 101 to reflector region 103, in which case the top reflector regions 102 of VCSELs 1, 2, and 3 are completely separated and isolated from each other by isolation structures 109. In some cases, isolation structures 109 may extend through reflector region 103 as well. As such, VCSELs 1, 2, and 3 are completely separated from each other by isolation structures 109.

FIG. 1-B is a cross-sectional view of a prior art trench-type VCSEL array. As shown, array 110 may be fabricated on a substrate 116 and comprise VCSELs 1, 2, and 3. Each VCSEL may include an active region 111, a top reflector region 112, a bottom reflector region 113, and a current confining oxide layer 114. Top and bottom reflector regions 112 and 113 may comprise a p-type DBR and an n-type DBR structures, respectively. The current confining oxide layer 114 may be arranged to form an oxide aperture 115 for each VCSEL emitter. A laser beam output window may be aligned with oxide aperture 115. As shown, top reflector region 112, oxide aperture 115, and bottom reflector 113 may form an optical cavity or laser cavity. Oxide aperture 115 not only serves to form the laser cavity, but also to direct the electrical current through the central region of the cavity.

On the surface of top reflector region 112, a top contact metal layer may be deposited to create the top contacts 117 for the VCSELs. Then, a pad metal layer (not shown), as the anode contact of array 110, may be deposited on top contacts 117. FIG. 1-D illustrates the top contacts 117 of the prior art VCSEL array from the top view. As shown, the top contact 117 for each VCSEL is ring-shaped. On the bottom surface, a metal layer 118 may be deposited as the bottom contact metal and serve as the cathode contact of array 110.

VCSELs 1, 2, and 3 are separated by isolation structures 119. Isolation structures 119 are made by ion implantation, which is a complicated and expensive process. These isolation structures have an annular or ring shape such that each VCSEL emitter is encircled by an isolation ring completely. As shown in FIG. 1-B, isolation structures 109 may extend vertically through the top reflector region 112 and the active region 111 to reflector region 113, in which case the top reflector regions 112 of VCSELs 1, 2, and 3 are completely separated and isolated from each other by isolation structures 119. In some cases, isolation structures 119 may extend through reflector region 113 as well. As such, VCSELs 1, 2, and 3 are completely separated from each other by isolation structures 119.

FIG. 1-C schematically illustrates a top view of the prior art VCSEL array shown in FIG. 1-B. Particularly, FIG. 1-B is the cross-sectional view along direction S-S' shown in FIG. 1-C. As shown, a plurality of oxidation holes 120 are etched around each VCSEL for oxidizing layer 114. Each oxidation hole 102 may extend vertically through top reflector region 112, as illustrated in FIG. 1-E.

FIGS. 2-A, 2-B, 2-C, and 2-D schematically illustrate a VCSEL array 200, according to one embodiment of the present invention. FIG. 2-A is a cross-sectional view along a line AA' in FIG. 2-B. FIG. 2-B is a top view and FIG. 2-D is a cross-sectional view along a line BB' in FIG. 2-B. FIG. 2-C illustrates the top contacts of the VCSEL array. As shown, array 200 may be fabricated on a substrate 206 and comprise VCSELs 1, 2, and 3. Each VCSEL may include an active region 201, a top reflector region 202, a bottom reflector region 203, and a current confining oxide layer 204. Top and bottom reflector regions 202 and 203 may comprise a p-type DBR and an n-type DBR structures, respectively. The current confining oxide layer 204 may be arranged to form an oxide aperture 205 for each VCSEL emitter. A laser beam output window 211 may be aligned with oxide aperture 205. As shown, top reflector region 202, oxide aperture 205, and bottom reflector 203 may form an optical cavity or laser cavity. Oxide aperture 205 not only serves to form the laser cavity, but also to direct the electrical current through the central region of the cavity.

On the surface of top reflector region 202, a top contact metal layer may be deposited as the top contact 207 for the VCSELs of the array. Unlike the top contacts in the prior art VCSEL arrays discussed above, which are ring-shaped and structurally isolated from each other in the top contact metal layer, the top contact 207 is a physically connected, net-like metal layer serving as the top contact for all VCSELs of the array. FIG. 2-C is a top view of the top contact 207. Then, a pad metal layer (not shown), as the anode contact of array 200, may be deposited on top contact 207. On the bottom surface, a metal layer 208 may be deposited as the bottom contact metal and serve as the cathode contact of array 200.

Unlike a conventional VCSEL array such as array 100 shown in FIG. 1-A or array 110 shown in FIG. 1-B, VCSELs 1, 2, and 3 of array 200 are not completely encircled by an isolation structure. Instead, as shown in FIGS. 2-A and 2-B, the VCSELs may be surrounded partially by separate oxidation holes 209, which are configured for oxidizing an aluminum (Al)-rich or relatively high Al-content layer. Each oxidation hole 209 may extend vertically through top reflector region 202, as illustrated in FIG. 2-C. Optionally, additional oxidation holes 210 may be arranged. Oxidation holes 210 may play a complementary oxidation role.

Hence, as shown in FIGS. 2-A and 2-B, the top reflector regions 202 of VCSELs 1, 2, and 3 are connected such that they are not isolated from each other completely by any isolation structure such as an isolation trench or ion implantation in a ring shape. For example, along line AA' and other paths, the top reflector regions 202 of VCSELs 1, 2, and 3 are connected without any isolation structure in between.

Therefore, unlike conventional VCSEL arrays, VCSEL array 200 has non-isolated emitters and the top reflector regions of the emitters are connected such that they are not isolated from each other completely by any isolation structure. Therefore, additional routes for current/heat flow is provided in top DBR, which reduces series-resistance/thermal-resistance of VCSEL array, effectively reduce driving voltage. Pristine epitaxy layers that are not damaged by ion implant or dry/wet etching chemicals provide faster heat dissipation rate than the one in conventional VCSEL array structure. Furthermore, generated heat can be effectively transferred to a thick pad metal that acts as a heat sink through much wider top contact metal area. Moreover, the ion implantation is no longer needed in the fabrication process. As such, fabrication of VCSEL 200 may be less complicated and less expensive compared to a conventional VCSEL array.

The non-isolated VCSEL emitters discussed above are of top-emitting VCSELs. In other embodiments, arrays of non-isolated bottom-emitting VCSEL emitters may be configured using the same or similar oxidization methods including the same or similar designs of oxidation holes.

FIGS. 3-A and 3-B schematically illustrate a VCSEL 300 in cross-sectional views, according to one embodiment of the present invention. VCSEL 300 may be one of the emitters of a VCSEL array (not shown) in an embodiment. VCSEL 300 may comprise an active region 301, a top reflector region 302, and a bottom reflector region 303. The regions 301-303 may be epitaxially grown on a substrate 305. An Al-rich or relatively high Al-content layer 304 is disposed close to active region 301. Other parts or sections of VCSEL 300 such as the top and bottom contact metal are omitted for simplicity reasons. In some embodiments, layer 304 may be arranged between active region 301 and top reflector region 302, as in FIG. 3-A. In some other embodiment, layer 304 may be arranged between active region 301 and bottom reflector region 302.

Layer 304 may be made of a compound that contains relatively high Al mole fraction. For example, in some embodiments, the compound may be AlGaAs and an Al mole fraction may be 0.95 or even 0.98. Layer 304 may be selectively oxidized to form an oxide aperture. First, oxidation holes 306 are etched which may extend through top reflector region 302 and expose sides of layer 304, as shown in FIG. 3-A. In some embodiments, oxidation holes 306 may extend to bottom reflector layer 303. In some other embodiments, oxidation holes 306 may just extend to active region 301. When the etched sides of layer 304 are exposed to hot water vapor or a dry oxygen environment, the layer oxidizes to form a current confining oxide layer 307, as shown in FIG. 3-B. The oxidation rate is strongly dependent on the Al-content. As the other layers may have a lower Al mole fraction, such as below 0.9, they are more slowly oxidized. The high rate of oxidation in Al-rich layer 304 determines a lateral oxidation process that spreads outward from each oxidation hole 306 along the layer. Thus, the duration of the oxidation process determines the lateral extent of the current confining oxide layer 307 and controls the remaining part of layer 304. The remaining part of layer 304 is arranged to form an oxide aperture 308 of VCSEL 300, as described in FIG. 3-B.

FIGS. 4-A, 4-B, 4-C, and 4-D illustrate oxidation processes graphically, according to one embodiment of the present invention. FIGS. 4-A to 4-D are in top views and focused on one layer of a chip 400. Assuming that chip 400 comprises a relatively high Al-content layer 401 of a VCSEL array structure. As aforementioned, layer 401 may be disposed close to an active region and between a top reflector region and a bottom reflector region. Layer 401 will be oxidized to create an oxide aperture for a VCSEL emitter (not shown). The VCSEL emitter may be one of a plurality of emitters (not shown) formed on chip 400. Hence, the top views in FIGS. 4-A to 4-D only reflect a part of chip 400. Also, assuming that layer 401 contains the highest Al-content and therefore is more strongly oxidized than other layers of the VCSEL emitter. Layer 401 is arranged to form an oxide aperture.

The oxide aperture is configured for electrical current limiting and confinement that simultaneously provides the transverse optical guiding. As such, the oxide aperture, as an area not oxidized, may have a predetermined shape and predetermined dimensions. In addition, regions outside and surrounding the oxide aperture should be fully oxidized such that the electric current only passes through the oxide aperture.

FIG. 4-A illustrates layer 401 before oxidation holes are etched, while FIG. 4-B illustrates layer 401 with oxidation holes 402 etched through it. Holes 402 may have a trapezoid-like shape. In some embodiments, holes 402 may be evenly distributed within a ring (not shown). The ring and holes 402 may be concentric on a center of an oxide aperture to be formed. In addition, holes 402 may be arranged separate from each other. The trapezoid-like shape may have a top and a bottom curve that fit the outer and inner circles of the ring. The shape and position of holes 402 may be designed to create a circle-like oxide aperture 405, as shown in FIG. 4-C. When an oxidizing process starts, it begins from the oxidation holes. The oxidation propagates outward from each oxidation hole and eventually forms an oxide layer but leaving the oxide apertures 405 unoxidized after a time period. Thus, the shape and position of holes 402 plus the oxidation time determine the shape and size of oxide aperture 405. As such, Al-rich layer 401 becomes an oxide layer 404 except oxide aperture 405 and the oxidation holes, as shown in FIG. 4-C exemplarily. Additionally, complementary oxidation holes 403 may be arranged, in case some areas outside aperture 405 are not oxidized or fully oxidized.

In some embodiments, oxidation holes 402 may have other shapes, such as a square shape, a rectangular shape, a circular shape, etc. In some other embodiments, oxidation holes 402 may have an irregular shape. In some embodiments as aforementioned, oxidation holes 402 may form groups of oxidation holes. Oxidation holes in each group may be separately positioned and concentric on a center of a corresponding oxide aperture. Consequently, resultant oxide apertures may have a shape that may be close to a circle or a circle-like polygon. For example, in FIG. 4-D, separate oxidation holes 406 may have a circular shape and be concentric on a center of a predetermined oxide aperture. Similarly, complementary oxidation holes 407 may be arranged to oxidize regions outside the aperture completely.

In some embodiments, aperture shapes other than a circle or a circle-like shape may be desired. In such cases, oxidation holes may be configured to form a pattern resembling an enlarged version of the desired shape. For example, when oxide aperture 405 has a circular shape, oxidation holes 402 or 406 may form an enlarged circular pattern. When another shape such as an oval shape is needed, oxidation holes 402 or 406 may be rearranged to form an enlarged pattern of that shape, such as an enlarged oval shape.

FIG. 5 schematically illustrates a VCSEL array 500 in a top view, according to one embodiment of the present invention. As shown in the figure, array 500 may include non-isolated VCSEL emitters formed in a matrix pattern. In some embodiments, array 500 may have more emitters with a larger matrix. Each VCSEL emitter may comprise a first reflector region such as a top reflector region, an oxide layer, an active region, and a second reflector region such as a bottom reflector region. The regions and layer are not shown in the figure for simplicity reasons. Each emitter may also comprise a laser beam output window 501 formed in a pad metal layer 502. Each output windows 501 are surrounded by a group of oxidation holes 503 that may be concentric on the center of the output window. In some embodiments, oxidation holes 503 may have a trapezoid-like shape, as shown in the figure. Each output window 501 may be aligned with an oxide aperture arranged below the top reflector region. Sizes of output window 501 and the oxide aperture may be similar. Besides oxidation holes 503, complementary oxidation holes (not shown) may be arranged in some embodiments.

FIG. 6 schematically illustrates a VCSEL array 600 in a top view, according to one embodiment of the present invention. Array 600 may be similar to array 500 shown in FIG. 5 except the array pattern design. As shown in FIG. 6, array 600 includes an array of non-isolated VCSEL emitters. Elements in adjacent rows and columns of the array are not aligned, while elements in rows and columns separated by another row and column are aligned. In some embodiments, array 600 may have more VCSEL emitters with a larger array. Again, each VCSEL emitter may comprise a first reflector region, an oxide layer, an active region, and a second reflector region. The regions and layer are not shown in the figure for simplicity reasons. Each emitter may also comprise a laser beam output window 601 formed in a pad metal layer 602. Each output window 601 may be surrounded by a group of oxidation holes 603 that may be concentric on the center of the output window. In some embodiments, oxidation holes 603 may have a trapezoid-like shape, as in FIG. 6. Each output window 601 may be aligned with an oxide aperture arranged below it. Sizes of output window 601 and the oxide aperture may be similar. Unlike array 501, oxidation holes 603 configured in such a pattern may be sufficient for an oxidation process. Hence, complementary oxidation holes may not be needed.

FIG. 7 schematically illustrates VCSEL arrays 700 in a top view, according to one embodiment of the present invention. Arrays 700 may include VCSEL arrays 701, 702, and 703 exemplarily. In some embodiments, the three arrays may have the same pattern and size. In some other embodiments, the arrays may have different patterns and sizes. Each array may include a certain number of non-isolated VCSEL emitters. Arrays 701-703 each may have a common anode and a common cathode and be operated independently. VCSEL emitters of the arrays may be electrically coupled to a corresponding common anode and common cathode respectively.

The VCSEL emitters may each comprise a top reflector region, an oxide layer, an active region, and a bottom reflector region. The regions and layer are not shown in FIG. 7 for simplicity reasons. Each emitter may also comprise a laser beam output window 704 that is surrounded by concentric oxidation holes 705. In some embodiments, oxidation holes 705 may have a trapezoid-like shape. In some other embodiments, oxidation holes 705 may have another shape. Each output window 704 may be aligned with an oxide aperture arranged below the output window. Sizes of output window 704 and the oxide aperture may be similar. Besides oxidation holes 705, complementary oxidation holes (not shown) may be arranged for an oxidation process.

As shown in FIG. 7, arrays 701, 702 and 703 are separated by gaps 706 and 707. Gaps 706 and 707 may each include a shallow trench. The shallow trench may be made by etching away a portion of a pad metal layer and a portion of a top contact metal layer that are deposited on a surface of the top reflector region. Hence, the three arrays 701-703 may be non-isolated as well, because they are connected by portions of the top reflector regions. Thus the three arrays are not isolated from each other by any isolation structures in the top reflector region.

FIG. 8 schematically illustrates VCSEL arrays 800 in a top view, according to one embodiment of the present invention. Arrays 800 may include VCSEL arrays 801, 802, and 803 exemplarily. Arrays 800 may be similar to arrays 700 shown in FIG. 7 except the separation structures that separate them. For example, Arrays 800 and 700 may comprise identical arrays of non-isolated VCESL emitters. Arrays 801-803 each may have a common anode and a common cathode and be operated independently. VCSEL emitters of the arrays may be electrically coupled to a corresponding common anode and common cathode, respectively.

Similarly, the VCSEL emitters at arrays 800 may each comprise a top reflector region, an oxide layer, an active region, and a bottom reflector region. Each emitter may also comprise a laser beam output window 804 that is surrounded by concentric oxidation holes 805. In some embodiments, oxidation holes 805 may have a trapezoid-like shape. In some other embodiments, oxidation holes 805 may have another shape. Output window 804 may be aligned with an oxide aperture arranged below it. Sizes of output window 804 and the oxide aperture may be similar.

As illustrated in FIG. 8, arrays 801, 802 and 803 are separated by isolation structures 806 and 807. In some embodiment, isolation structures 806 and 807 may be made by etching and the trenches may be filled with one or more dielectric materials. In some other embodiments, isolation structures 806 and 807 may be made by ion implantation. In some embodiments, the isolation structures may extend through the top reflector regions. In some other embodiments, the isolation structures may extend through the bottom reflector regions. As such, arrays 801, 802, and 803 may not be connected by portions of the top reflector regions. Instead, top reflector regions of the three arrays may be isolated from each other by the isolation structures.

FIG. 9 is a flow chart illustrating a schematic fabrication process 900 for a VCSEL array, according to one embodiment of the present invention. The VCSEL array comprises non-isolated emitters. Process 900 may start from a substrate such as an n-type GaAs wafer. At step 901, a plurality of layers as a bottom reflector region may be grown epitaxially on the substrate. The bottom reflector region comprises a DBR structure. After depositing the bottom reflector region, an active region may be grown epitaxially at step 902. The active region may comprise a MQW region. Next at step 903, a relatively high Al-content layer may be deposited epitaxially. Alternatively, the relatively high Al-content layer may be deposited between step 901 and step 902. At step 904, a plurality of layers as a top reflector region may be grown epitaxially. The top reflector region may comprise another DBR structure. Then at step 905, oxidation holes are formed by a dry etching process. The oxidation holes expose sides of the relatively high Al-content layer. In some embodiments, the oxidation holes may form a plurality of groups. Oxidation holes of each group may be separately positioned and concentric on a center of an oxide aperture to be formed. At step 906, a wet oxidizing process (e.g., using hot water vapor) may be implemented to oxidize the relatively high Al-content layer selectively to form oxide apertures. Then, the oxidation holes may be filled with one or more dielectric materials. Next, the top contact metal, bottom contact metal, and pad metal may be deposited.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A Vertical Cavity Surface Emitting Laser (VCSEL) array, comprising:
a substrate; and
a plurality of VCSEL structures formed in an area on the substrate, each VCSEL structure comprising:
a first reflector region;
a top contact metal layer over the first reflector region;
a current confining oxide layer below the first reflector region;
an active region; and
a second reflector region;
wherein the first reflector regions of the plurality of VCSEL structures are connected such that they are not completely isolated from each other by any isolation structure, all of the top contact metal layers of the plurality of VCSEL structures in each column and each row of the VCSEL array are physically connected, and the second reflector regions of the plurality of VCSEL structures are connected such that they are not completely isolated from each other by any isolation structure.

2. The VCSEL array of claim 1, wherein the first reflector region and the second reflector region each comprise a Distributed Bragg Reflector (DBR) structure.

3. The VCSEL array of claim 1, wherein the current confining oxide layer is disposed between the first reflector region and the active region.

4. The VCSEL array of claim 1, wherein the current confining oxide layer is disposed between the second reflector region and the active region.

5. The VCSEL array of claim 1, wherein the current confining oxide layer forms an oxide aperture.

6. The VCSEL array of claim 5, wherein each oxide aperture is surrounded by a plurality of oxidation holes that extends vertically through at least the first reflector region.

7. The VCSEL array of claim 6, wherein the plurality of oxidation holes is separate and concentric on a center of the oxide aperture.

8. The VCSEL array of claim 7, wherein each oxidation hole is trapezoid-like shape.

9. The VCSEL array of claim 6, wherein the plurality of oxidation holes was used for creating the current confining oxide layer through a wet oxidation process.

10. The VCSEL array of claim 1, wherein the top contact metal layers serve as top contacts for the plurality of VCSEL structures.

* * * * *